(12) United States Patent
Ruchti

(10) Patent No.: US 7,202,796 B2
(45) Date of Patent: Apr. 10, 2007

(54) DEVICE AND METHOD FOR TRIGGERING A SENSOR FOR CABLES

(75) Inventor: Nicolas Ruchti, Cham (CH)

(73) Assignee: Komax Holding AG, Dierikon (CH)

( * ) Notice: Subject to any disclaimer, the term of this patent is extended or adjusted under 35 U.S.C. 154(b) by 126 days.

(21) Appl. No.: 10/954,369

(22) Filed: Oct. 1, 2004

(65) Prior Publication Data

US 2005/0109594 A1 May 26, 2005

(30) Foreign Application Priority Data

Oct. 3, 2003 (EP) ................................. 03022313

(51) Int. Cl.
G08B 21/00 (2006.01)
H01H 47/126 (2006.01)
G01R 19/00 (2006.01)
H02G 3/04 (2006.01)
G01L 1/00 (2006.01)

(52) U.S. Cl. ................ 340/686.1; 340/686.6; 361/179; 361/180; 361/181; 324/66; 324/67; 174/68.1; 174/258; 174/110 R; 73/862.68; 73/827

(58) Field of Classification Search ............ 340/686.1, 340/686.6; 361/179–181; 73/862.68, 827; 324/66–67; 174/68.1, 258, 110 R
See application file for complete search history.

(56) References Cited

U.S. PATENT DOCUMENTS

| 4,601,093 | A |   | 7/1986  | Cope |
| 4,639,824 | A | * | 1/1987  | Furlong et al. ............. 361/179 |
| 4,679,117 | A | * | 7/1987  | Butcher et al. ............. 361/181 |
| 4,745,828 | A |   | 5/1988  | Stepan |
| 4,806,193 | A | * | 2/1989  | Von Raben et al. ......... 156/378 |
| 4,887,470 | A | * | 12/1989 | Flyer et al. .............. 73/862.68 |
| 5,140,873 | A |   | 8/1992  | Schwartzman |
| 6,271,621 | B1| * | 8/2001  | Ito et al. ..................... 310/358 |
| 6,360,430 | B1|   | 3/2002  | Stepan |

FOREIGN PATENT DOCUMENTS

DE 39 02 697 A1 8/1989

* cited by examiner

*Primary Examiner*—Daniel Wu
*Assistant Examiner*—Lam Pham
(74) *Attorney, Agent, or Firm*—Venable LLP; Stuart I. Smith; Ryan M. Flandro

(57) ABSTRACT

In order to provide a triggering signal for a cable stripping device that is also capable of dealing with very thin wires, it is suggested to use a piezoelectric sensor, the output signal from which is forwarded to an electronic evaluation unit. The electronic evaluation unit then outputs a digital signal that enables the stripping process to be started safely. Various mechanical mechanisms are suggested to ensure that the digital signal is not triggered when not being touched. This problem is proposed to be solved by a low pass filter discriminating between sensor inputs by touching and vibration shock events, etc.

12 Claims, 3 Drawing Sheets

Figure 1:
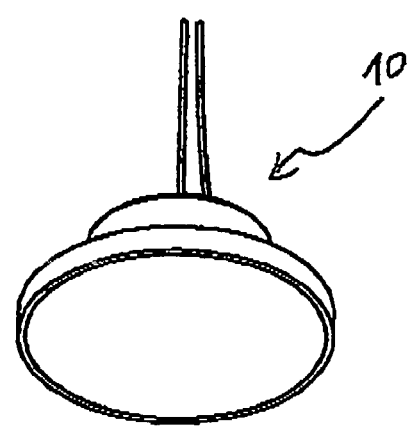

Input signal from the piezoelectric sensor:
Wire size: 30 AWG → Diameter: 0.2546 mm; Cross-section: 0.0509 mm$^2$ Output signal from the electronic evaluation unit:

DEVICE AND METHOD FOR TRIGGERING A SENSOR FOR CABLES

FIELD OF THE INVENTION

The present invention relates to a device for triggering a signal indicating that a cable end has reached a given position relative to its linear movement. The invention further relates to a method for triggering such a sensor.

BACKGROUND OF THE INVENTION

Prior Art

In the field of cable assembly, particularly during the automated stripping of conductors, technicians are familiar with the problem of ensuring that the cable end triggers a signal when it reaches a given advanced position during insertion into a stripping arrangement, and the need to find a method for achieving this. Accordingly, solutions including a mechanical triggering sensor have been disclosed in suggestions such as U.S. Pat. No. 4,745,828. According to that approach the end of the conductor that is to be stripped is moved towards a mechanical triggering sensor—known in this case as a pick-up—until the sensor is actuated, then the end of the conductor is immobilised in position by means of gripping jaws and the end of the conductor is incised in known manner for purposes of stripping.

For conductors having a certain diameter and the associated triggering force, the pick-up suggested in the document cited above, together with its limit stop, is also entirely capable of responding to the sensor technology and triggering the immobilisation and stripping process. However, problems have been encountered with conductor ends having very small diameters and the associated low triggering force, and it is these problems that are addressed by the present invention.

SUMMARY OF THE INVENTION

The object of the invention is thus to provide a sensor and an associated triggering mechanism for use particularly even with very thin conductor ends which do not exert sufficient force to actuate a mechanical trigger. The sensor may also be designed to serve as a mechanical limit stop.

The invention solves its object with a device for detecting a limit position of a conductor end during lengthwise advancement, including a piezoelectric sensor element delivering an electrical output signal which sensor element is arranged essentially perpendicularly to the direction of advancement, and an electronic evaluation unit that receives the electrical output signal from the piezoelectric sensor element in input signal and outputs a triggering signal as a function of its input signal.

The primary result of the invention is that even very thin conductor ends may be detected with the suggested sensor, without limiting the device to use exclusively with very thin conductors. The sensor is arranged in such manner that it may be moved away from the operating area to allow further operations.

Surprisingly, it has been found that a simple digitising circuit is sufficient for use as the electronic triggering unit, that is to say the electronic evaluation unit. Preferred, however, is the invention performed by preparing the current delivered by the sensor to the microprocessor by means of an current amplifier, a low pass filter and a precision rectifier in order to discriminate between touching of the sensor and vibration shock, e.g. from the environment.

According to another aspect of the invention a method for detecting a limit position of a conductor end during lengthwise advancement, including a piezoelectric sensor element arranged essentially perpendicularly to the direction of advancement, and an electronic evaluation unit, comprising the steps of advancing the conductor end as far as the piezoelectric sensor element to trigger a measurement signal, directing the electrical output signal from the piezoelectric sensor element to the electronic evaluation unit as an input signal, and outputting a triggering signal as a function of the input signal is proposed. This method is advantageous for triggering the immobilising and gripping mechanism for the conductor end to be stripped.

Additional advantageous features of the invention are also explained.

The elements that have been listed in the preceding and the use of which according to the invention is described in the following embodiments are not subject to any particular exceptional conditions in terms of their size, shape, constituent materials or technical design, which means that the generally known selection criteria may be applied in their respective fields of use.

Further details, features and advantages of the object of the invention will become apparent from the following detailed description of the associated drawing, in which—for exemplary purposes—a device and an associated process sequence is explained for the present invention.

BRIEF DISCUSSION OF THE DRAWINGS

Figure 2:
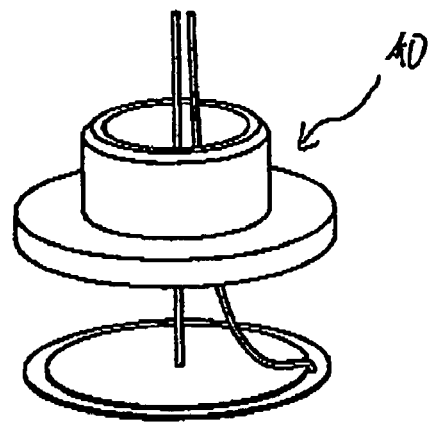
Figure 4:
Figure 5:
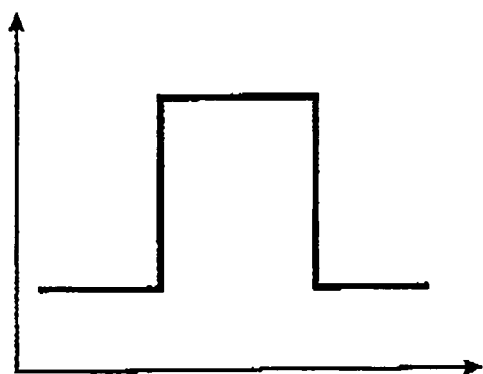
Figure 3A:
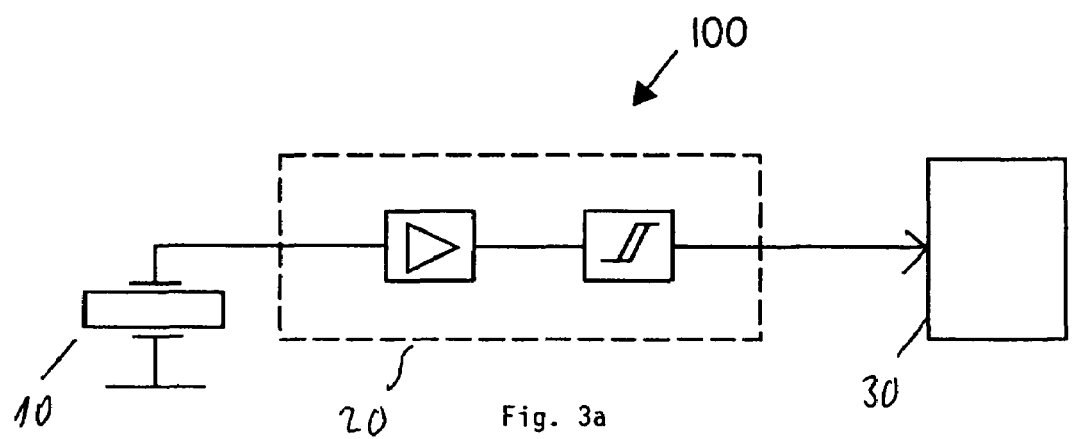
Figure 3B:
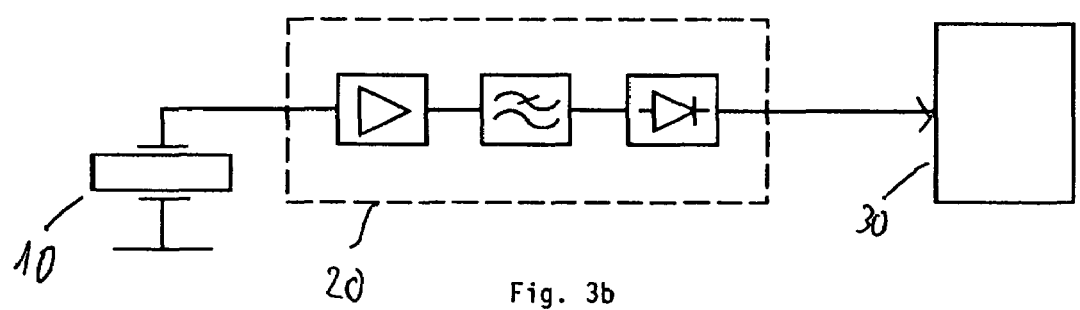
Figure 6:
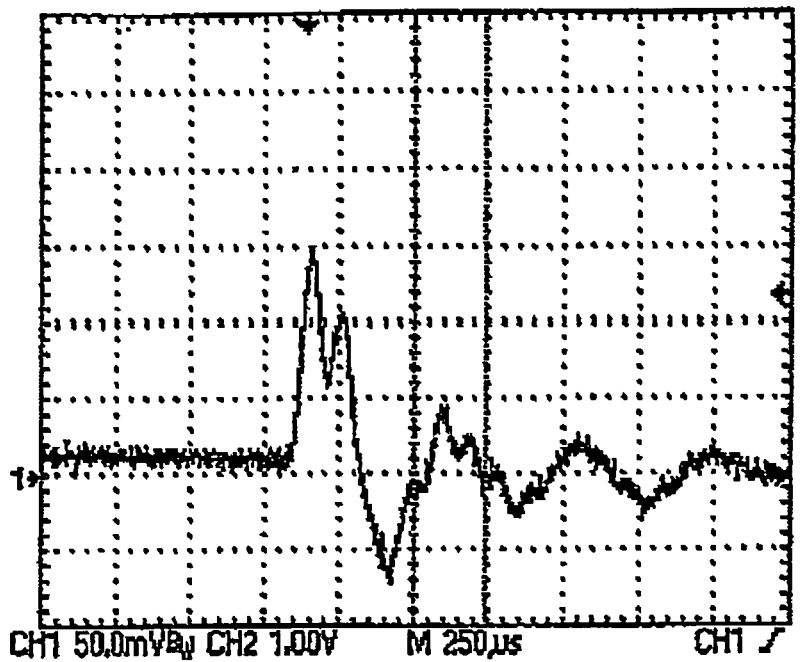
Figure 7:
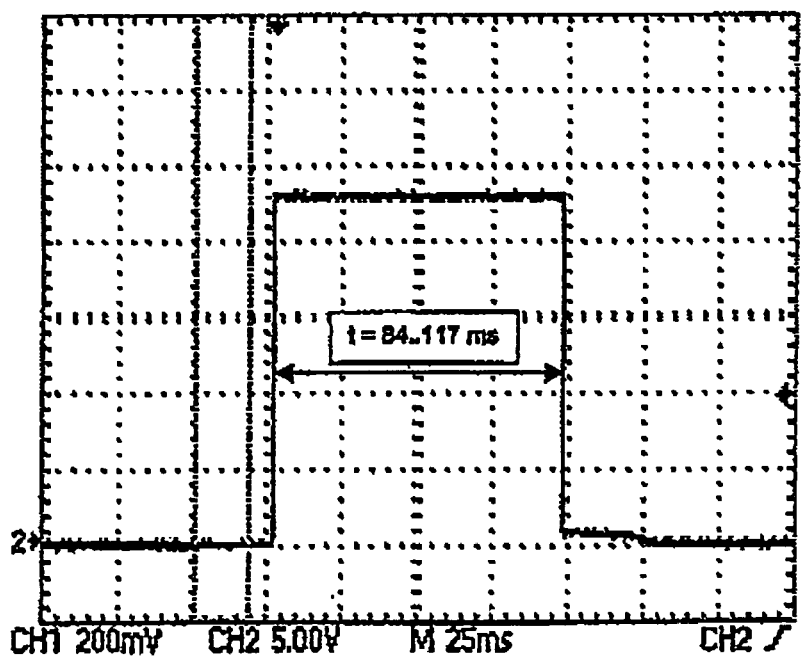

In the drawing:

FIG. 1 represents a typical piezoelectric element,

FIG. 2 represents the element of FIG. 1 in which the housing is shown separated from the actual sensor, FIG. 3*a* represents the device as a whole including the piezoelectric sensor, the electronic evaluation unit, and pick-ups for the digital triggering signal to begin the stripping process, according to a first embodiment of the invention, FIG. 3*b* represents the device as a whole including the piezoelectric sensor, the electronic evaluation unit, and pick-ups for the digital triggering signal to begin the stripping process, according to a second, preferred embodiment of the invention, FIG. 4 is a typical signal from the piezoelectric element after it has been touched by a thin wire, FIG. 5 is the digital signal created from the signal according to FIG. 4, FIG. 6 is a diagram according to FIG. 5, with a scale, and FIG. 7 is a diagram according to FIG. 6, with a scale.

DESCRIPTION OF THE PREFERRED EMBODIMENTS OF THE INVENTION

The device according to the invention, which is designated integrally in FIG. 3*a* with the number 100, represents one of the preferred embodiments, and essentially includes a piezoelectric sensor element 10 in a housing and an electronic evaluation unit 20. In the embodiment described in the following, a piezoelectric element produced by Stelco (type SS 11-J9-000) is used, but any element having equivalent performance characteristics may be used instead.

According to the embodiment, piezoelectric sensor element 10 is arranged such that the conductor end comes into essentially perpendicular contact with the actual sensor. FIG.

4 represents a typical signal that is emitted by the piezoelectric sensor element when the conductor end comes into contact with it.

Electronic evaluation unit 20, which is powered electrically by a 24 V power unit, now emits a digital signal (typically: Schmidt trigger) with standard height and width.

FIG. 6 shows the output signal from piezoelectric sensor element 10 as it appears on an oscilloscope. From this it is evident that a post-pulse oscillation is triggered when sensor element 10 is contacted by the conductor end, and must be standardised by electronic evaluation unit 20. The output signal from electronic evaluation unit 20 is shown in FIG. 7.

In the first embodiment show as a typical embodiment, the output signal from electronic evaluation unit 20 is sent to an interface card 30 of the stripping device. The advantage of this arrangement is that the device described here may be replaced as a unit by a conventional mechanical device (such as the one proposed in U.S. Pat. No. 4,745,828) or also by an optical triggering device, if only one similar digital signal is provided in each case.

In this exemplary embodiment, the circuitry for electronic evaluation unit 20 is configured such that it does not accept another signal from the piezoelectric sensor element for a defined time (e.g. 250 ms.) after the triggering process. On the other hand however, an additional input may also be provided to the electronic evaluation unit, which—additionally if necessary—blocks the electronic evaluation unit while the stripping process is being performed, until the stripped conductor end is ejected from the stripping device. These blocking means render inadvertent triggering highly unlikely.

In the more preferred embodiment according to FIG. 3b, of the current signal delivered by the piezoelectric sensor is prepared by electronic means in order to have a signal usable for the microprocessor. The electronic comprise a current amplifier, a low pass filter and a precision rectifier. This electronic means are dimensioned so that any signals generated by vibration shocks etc. not initiated by a touching of the sensor are suppressed.

What is claimed is:

1. A device for detecting a limit position of a conductor end during lengthwise advancement, the device comprising:
    a piezoelectric sensor element delivering an electrical output signal which sensor element is arranged essentially perpendicularly to the direction of advancement, and
    an electronic evaluation unit that receives the electrical output signal from the piezoelectric sensor element in input signal and outputs a triggering signal as a function of its input signal.

2. The device according to claim 1, wherein said electronic evaluation unit outputs a digital output signal for a microprocessor means.

3. The device according to claim 2, wherein said electronic evaluation unit processes an electrical output signal from the piezoelectric sensor element as its input signal only when the device is indicated to be ready.

4. The device according to claim 2, wherein said electronic evaluation unit does not process an electrical output signal from the piezoelectric sensor elements its input signal for a preset period after the last triggering process.

5. The device according to claim 1, wherein said electronic evaluation unit comprises a signal amplifier and a rectifier.

6. The device according to claim 5, wherein said electronic evaluation unit further comprises a low pass filter means.

7. The device according to claim 1, wherein said piezoelectric sensor element is arranged movably to allow further processing after the triggering process.

8. A method for detecting a limit position of a conductor end during lengthwise advancement, including a piezoelectric sensor element arranged essentially perpendicularly to the direction of advancement, and an electronic evaluation unit, said method comprising the steps of
    advancing the conductor end as far as the piezoelectric sensor element to trigger a measurement signal,
    directing the electrical output signal from the piezoelectric sensor element to the electronic evaluation unit as an input signal, and
    outputting a triggering signal as a function of the input signal.

9. The method according to claim 8, wherein said electronic evaluation unit emits a digital output signal to a microprocessor means.

10. The method according to claim 9, wherein said electronic evaluation unit accepts an electrical output signal from the piezoelectric sensor element as its input signal and outputs a digital output signal only when the device is indicated to be ready.

11. The method according to claim 9, wherein said electronic evaluation unit does not accept an electrical output signal from the piezoelectric sensor element as its input signal for a preset period after the last triggering process and during this time does not output any digital signals.

12. The method according to claim 8, wherein said piezoelectric sensor element is moved away from the sensor position following the digital triggering signal and is moved back into its sensor position when the measuring process has been completed.

* * * * *